(12) United States Patent
Shirai et al.

(10) Patent No.: US 10,978,939 B2
(45) Date of Patent: Apr. 13, 2021

(54) ELECTRIC ACTUATOR

(71) Applicant: NIDEC TOSOK CORPORATION, Kanagawa (JP)

(72) Inventors: Hiroshi Shirai, Kyoto (JP); Shuichi Kinjo, Kyoto (JP); Yutaka Uematsu, Kyoto (JP); Kenichi Ozawa, Kyoto (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 512 days.

(21) Appl. No.: 16/041,843

(22) Filed: Jul. 23, 2018

(65) Prior Publication Data

US 2019/0036422 A1 Jan. 31, 2019

(30) Foreign Application Priority Data

Jul. 25, 2017 (JP) .............................. JP2017-143637

(51) Int. Cl.

| *H02K 11/21* | (2016.01) |
| *H02K 5/22* | (2006.01) |
| *H02K 7/116* | (2006.01) |
| *H02K 7/06* | (2006.01) |
| *F16H 63/30* | (2006.01) |

(Continued)

(52) U.S. Cl.
CPC ............... *H02K 11/21* (2016.01); *F16H 1/06* (2013.01); *F16H 63/30* (2013.01); *G01D 5/145* (2013.01);

(Continued)

(58) Field of Classification Search
CPC ...... H02K 11/21; H02K 11/215; H02K 5/225; H02K 7/116; H02K 5/22; H02K 11/33;
(Continued)

(56) References Cited

U.S. PATENT DOCUMENTS

| 2,997,685 A | * | 8/1961 | Anderson ............ H01R 4/4809 439/625 |
| 4,191,442 A | * | 3/1980 | Caveney .............. H01R 4/2445 439/400 |

(Continued)

FOREIGN PATENT DOCUMENTS

| JP | 2001112215 | 4/2001 |
| JP | 2003285665 | 10/2003 |
| JP | 2016109226 | 6/2016 |

*Primary Examiner* — John K Kim
(74) *Attorney, Agent, or Firm* — JCIPRNET

(57) ABSTRACT

An electric actuator includes a first wiring member with a first connection portion exposed to one side in an axial-direction of a first case and a second wiring member with a second connection portion exposed to another side in the axial-direction of a second case, the first and second connection portions each having two opposing portions that respectively oppose in first and second directions with first and second gaps therebetween, the first gap having a narrow portion and a wide portion (larger in the first direction) connected thereto on the other side in the axial-direction, the second gap having a narrow portion and a wide portion (larger in the second direction) connected thereto on the one side in the axial-direction, and the first and second gaps overlapping at least partially when the first and second case are fixed, and the first and second connection portions are electrically connected.

16 Claims, 5 Drawing Sheets

(51) Int. Cl.
*H02K 11/33* (2016.01)
*F16H 1/06* (2006.01)
*G01D 5/14* (2006.01)
*H02P 8/34* (2006.01)
*H02K 11/215* (2016.01)

(52) U.S. Cl.
CPC ............... *H02K 5/22* (2013.01); *H02K 5/225* (2013.01); *H02K 7/06* (2013.01); *H02K 7/116* (2013.01); *H02K 11/215* (2016.01); *H02K 11/33* (2016.01); *H02P 8/34* (2013.01); *H02K 2211/03* (2013.01)

(58) Field of Classification Search
CPC ...... H02K 7/06; H02K 2211/03; F16H 63/30; F16H 1/06; G01D 5/145; H02P 8/34
USPC .......................................................... 310/71
See application file for complete search history.

(56) References Cited

U.S. PATENT DOCUMENTS

| | | | | |
|---|---|---|---|---|
| 4,451,109 A | * | 5/1984 | Inoue | H01H 85/2035 |
| | | | | 439/786 |
| 4,943,248 A | * | 7/1990 | Colleran | H01H 85/2035 |
| | | | | 439/620.33 |
| 9,444,311 B2 | * | 9/2016 | Ito | H02K 9/22 |
| 2013/0249335 A1 | * | 9/2013 | Motoda | H02K 11/0094 |
| | | | | 310/71 |
| 2014/0091683 A1 | * | 4/2014 | Ito | H02K 11/38 |
| | | | | 310/68 R |
| 2015/0171709 A1 | * | 6/2015 | Ito | H02K 9/22 |
| | | | | 310/52 |
| 2016/0036306 A1 | * | 2/2016 | Yamasaki | H02K 11/33 |
| | | | | 310/71 |
| 2019/0036422 A1 | * | 1/2019 | Shirai | H02K 11/21 |

* cited by examiner

ELECTRIC ACTUATOR

CROSS-REFERENCE TO RELATED APPLICATION

This application claims the priority benefit of Japan Patent Application No. 2017-143637, filed on Jul. 25, 2017. The entirety of the above-mentioned patent application is hereby incorporated by reference herein and made a part of this specification.

BACKGROUND

Technical Field

The present disclosure relates to an electric actuator.

Related Art

An electric actuator including two cases fixed to each other is known.

For example, Japanese Unexamined Patent Application Publication No. 2016-109226 describes an electric actuator including, as two cases, a rear case to which a stator is fixed and a front case to which a speed reducer is fixed.

In the electric actuator as described above, for example, in some cases, a connector portion is provided in one case (rear case) and an electric component such as a rotation detection device for detecting rotation of the speed reducer is housed in the other case (front case). In this case, for example, a first wiring member electrically connected to electrical wiring outside the case via the connector portion and a second wiring member electrically connected to the electric component are connected within a case, the electric component is electrically connected to the electrical wiring outside the case.

Connection between the first wiring member and the second wiring member is performed by, for example, soldering, fusing, or the like. However, in the case of using these connection methods, because it is necessary to insert equipment or equipment for connecting the wiring members to each other inside the case, it is necessary to provide the case with an opening portion that opens to the outside. As a result, it is necessary to close the opening portion after the wiring members have been connected to each other. Therefore, there is a problem that the labor and manufacturing cost of assembling the electric actuator increase.

Accordingly, it is an object of the present disclosure to provide a an electric actuator having a structure with which the labor and manufacturing cost of assembly are reduced.

SUMMARY

One aspect of the electric actuator of the present disclosure includes a motor having a motor shaft that extends in an axial direction, a first case that houses the motor and that has a first opening portion that opens to one side in the axial direction, a connector portion provided in the first case and to be connected to electrical wiring outside the first case, a first wiring member, at least indirectly, electrically connected to the electrical wiring via the connector portion and held by the first case, a second case having a second opening portion that opens to the other side in the axial direction, an electric component housed in the second case, and a second wiring member electrically connected to the electric component and held by the second case. The first case and the second case are fixed to each other in a state in which the first opening portion and the second opening portion oppose each other in the axial direction. The first wiring member has a first connection portion exposed to the one side in the axial direction of the first case and the second wiring member has a second connection portion exposed to the other side in the axial direction of the second case. The first connection portion has a plate shape having a first plate surface along a first direction perpendicular to the axial direction and has a pair of first opposing portions that oppose each other in the first direction with a first gap between the pair of first opposing portions, the first gap penetrating the first connection portion in a direction perpendicular to the first plate surface and opening to the one side in the axial direction. The second connection portion has a plate shape having a second plate surface that is perpendicular to the axial direction and that extends in a second direction crossing the first direction and has a pair of second opposing portions that oppose each other in the second direction with a second gap between the pair of second opposing portions, the second gap penetrating the second connection portion in a direction perpendicular to the second plate surface and opening to the other side in the axial direction. The first gap includes a first narrow portion and a first wide portion connected to the first narrow portion on the other side in the axial direction and having a dimension in the first direction larger than a dimension of the first narrow portion. The second gap has a second narrow portion and a second wide portion connected to the second narrow portion on the one side in the axial direction and having a dimension in the second direction larger than a dimension of the second narrow portion. The first connection portion and the second connection portion are disposed at positions where the first gap and the second gap overlap at least partially in a state in which the first case and the second case are fixed, and the first connection portion and the second connection portion are electrically connected to each other. According to the aspect of the present disclosure, there is provided an electric actuator having a structure capable of reducing labor and manufacturing cost of assembly.

The above and other elements, features, steps, characteristics and advantages of the present disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF EMBODIMENTS

In each figure, the Z axis direction is the vertical direction with the positive side as the upper side and the negative side as the lower side. The axial direction of the central axis J appropriately illustrated in each drawing is parallel to the Z-axis direction, that is, the vertical direction. In the following description, a direction parallel to the axial direction of the central axis J is simply referred to as "axial direction Z". In addition, the X axis direction is a first direction X that is a horizontal direction perpendicular to the axial direction Z. The Y axis direction is a second direction Y that is a horizontal direction perpendicular to the axial direction Z. The first direction X and the second direction Y are perpendicular to each other.

In addition, the radial direction from the central axis J is simply referred to as "radial direction", and the circumferential direction around the central axis J is simply referred to as "circumferential direction". In the present embodiment, the lower side corresponds to one side in the axial direction and the upper side corresponds to the other side in the axial direction. Further, the upper side and the lower side are merely terms for explaining the relative positional relationship between respective elements, and the actual arrangement relationship or the like may be an arrangement relationship or the like other than the arrangement relationship indicated by these names or the like.

Figure 1:
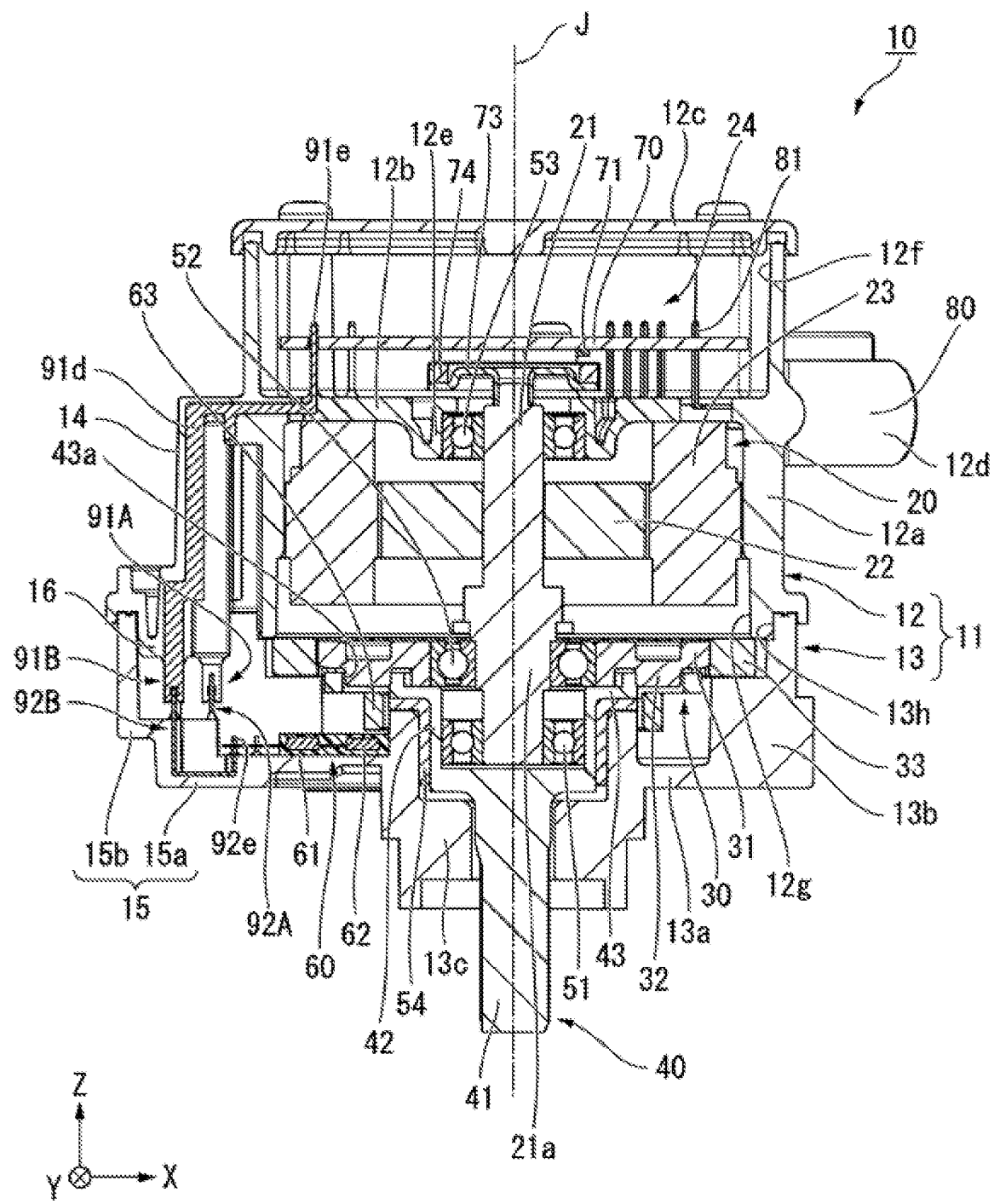
FIG. 1 is a sectional view illustrating an electric actuator according to a present embodiment.
Figure 2:
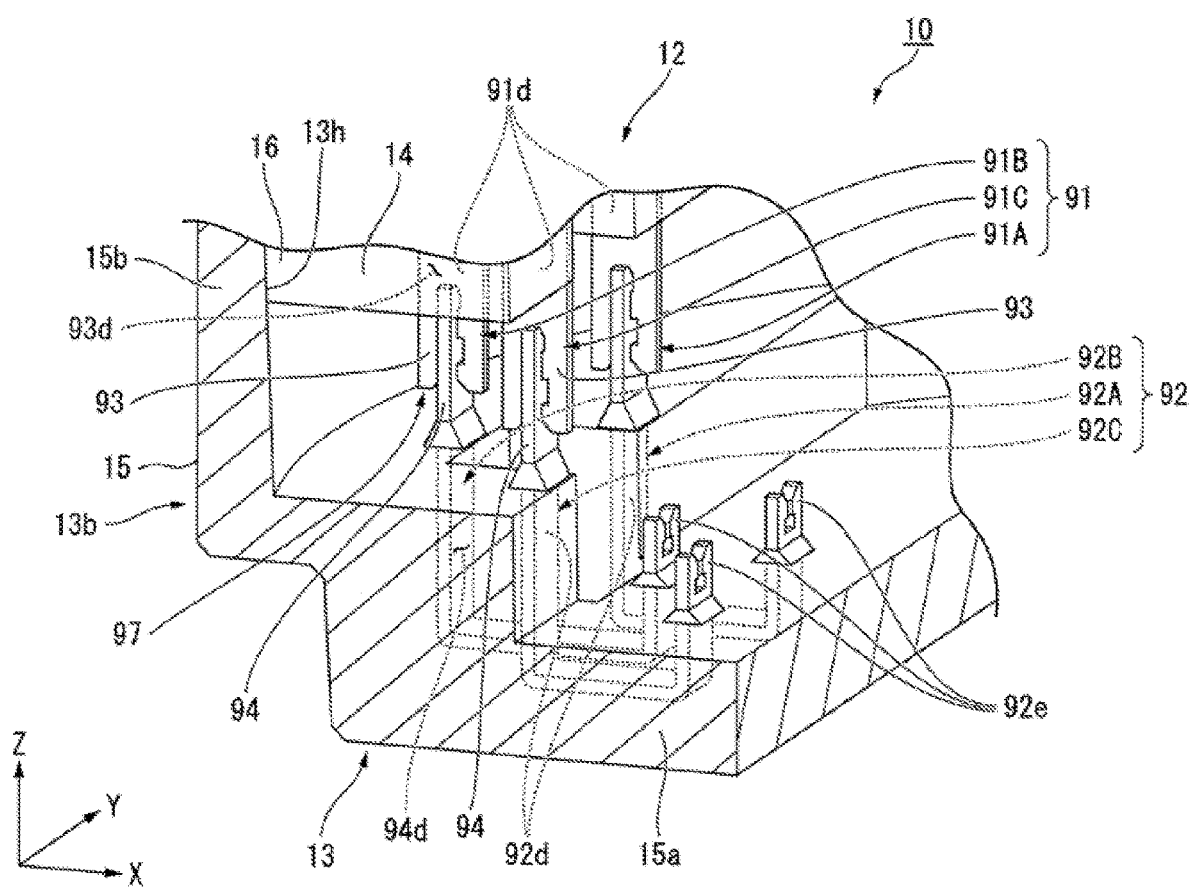
FIG. 2 is a partial sectional perspective view illustrating a portion of the electric actuator of the present embodiment.

As illustrated in FIG. 1 and FIG. 2, an electric actuator 10 of the present embodiment includes a case 11, a motor 20 having a motor shaft 21 extending in the axial direction Z along the central axis J, a control unit 24, a connector portion 80, a speed reduction mechanism 30, an output unit 40, a rotation detection device 60, first wiring members 91, second wiring members 92, a first bearing 51, a second bearing 52, a third bearing 53, and a bush 54. The first bearing 51, the second bearing 52, and the third bearing 53 are, for example, ball bearings. In the present embodiment, the rotation detection device 60 corresponds to an electric component.

As illustrated in FIG. 1, the case 11 houses the motor 20 and the speed reduction mechanism 30. The case 11 includes a motor case 12 that houses the motor 20 and a speed reduction mechanism case 13 that houses the speed reduction mechanism 30. The motor case 12 corresponds to a first case. The speed reduction mechanism case 13 corresponds to a second case. That is, the electric actuator 10 includes the motor case 12 as a first case and the speed reduction mechanism case 13 as a second case. The motor case 12 has a case cylindrical portion 12a, an upper lid portion 12c, an annular plate portion 12b, a bearing holding portion 12e, a control board housing portion 12f, a terminal holding portion 12d, and a first wiring holding portion 14.

The case cylindrical portion 12a has a cylindrical shape extending in the axial direction Z about the central axis J. The case cylindrical portion 12a opens at both sides in the axial direction Z. The case cylindrical portion 12a has a first opening portion 12g that opens downward. That is, the motor case 12 has the first opening portion 12g. The case cylindrical portion 12a surrounds the radially outer side of the motor 20. The annular plate portion 12b has an annular plate shape that extends radially inward from the inner circumferential surface of the case cylindrical portion 12a. The annular plate portion 12b covers the upper side of a stator 23 (to be described later) of the motor 20. The bearing holding portion 12e is provided on the radially inner edge portion of the annular plate portion 12b. The bearing holding portion 12e holds the third bearing 53.

The control board housing portion 12f is a portion that houses a control board 70 (to be described later). The control board housing portion 12f is formed radially inward of the upper portion of the case cylindrical portion 12a. The bottom surface of the control board housing portion 12f is the upper surface of the annular plate portion 12b. The control board housing portion 12f opens upward. The upper lid portion 12c is a plate-like lid that closes the upper end opening of the control board housing portion 12f. The terminal holding portion 12d protrudes radially outward from the case cylindrical portion 12a. The terminal holding portion 12d has a cylindrical shape that opens radially outward. The terminal holding portion 12d holds a terminal 81 (to be described later).

The first wiring holding portion 14 protrudes radially outward from the case cylindrical portion 12a. In FIG. 1, the first wiring holding portion 14 protrudes from the case cylindrical portion 12a toward the negative side in the first direction X. The first wiring holding portion 14 extends in the axial direction Z. The position of the upper end portion of the first wiring holding portion 14 in the axial direction is substantially the same as the position of the annular plate portion 12b in the axial direction. The position of the first wiring holding portion 14 in the circumferential direction is, for example, different from the position of the connector portion 80 in the circumferential direction.

The motor case 12 has a fitting projecting portion 16 fitted to at least a portion of a second opening portion 13h (to be described later) of the speed reduction mechanism case 13. That is, in the present embodiment, the motor case 12 corresponds to one case and the speed reduction mechanism case 13 corresponds to the other case. The fitting projecting portion 16 of the present embodiment protrudes downward from the lower end portion of the case cylindrical portion 12a and the lower end portion of the first wiring holding portion 14. The fitting projecting portion 16 has an annular shape and is provided along the radially outer edge portion of the lower end portion of the motor case 12 over the entire circumference.

Figure 3:
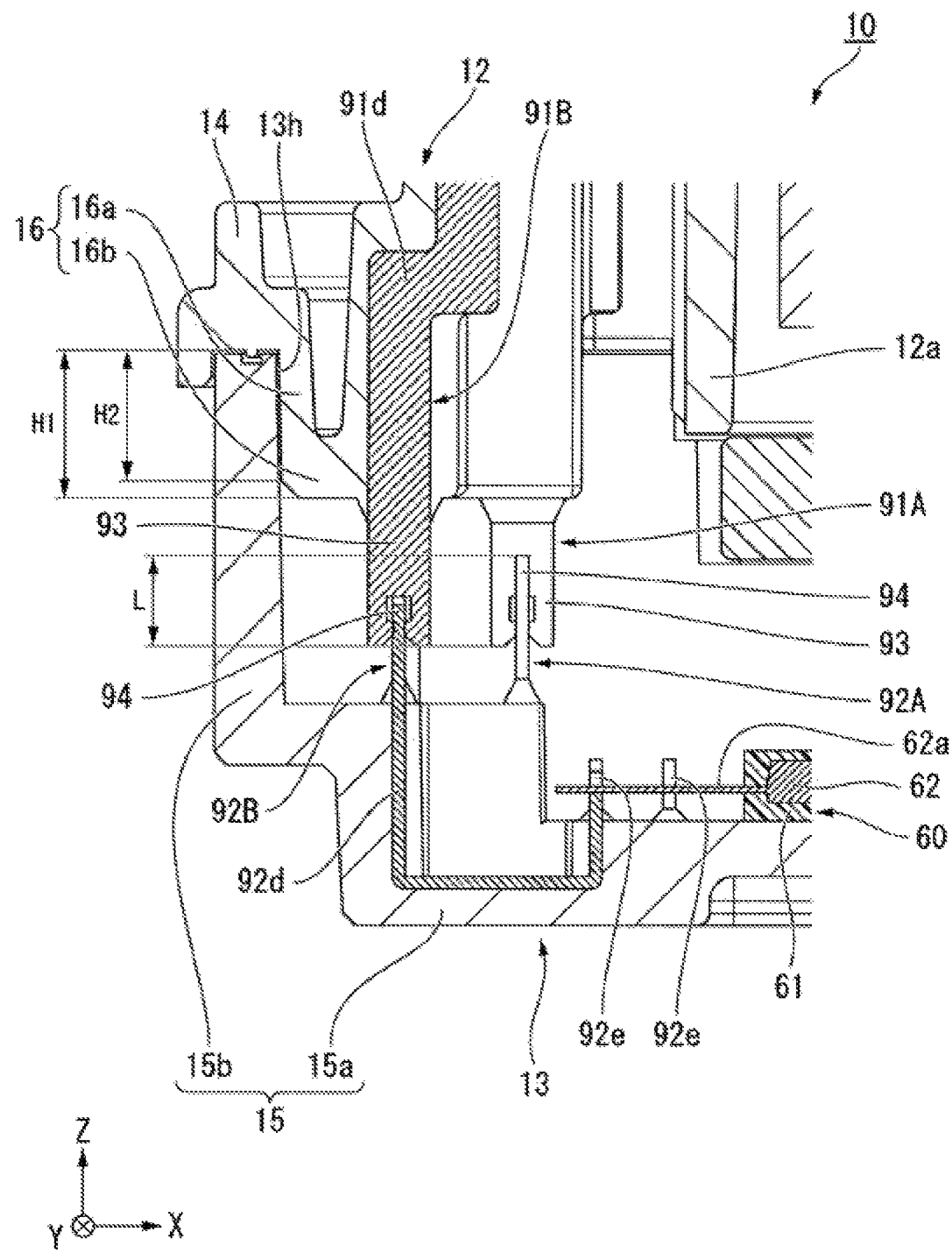
FIG. 3 is a sectional view illustrating a portion of the electric actuator of the present embodiment.

As illustrated in FIG. 3, the fitting projecting portion 16 has a fitting projecting portion main body 16a and a tapered portion 16b. The fitting projecting portion main body 16a is a portion that protrudes downward from the lower end portion of the case cylindrical portion 12a and the lower end portion of the first wiring holding portion 14. The tapered portion 16b is connected to the lower end portion of the fitting projecting portion main body 16a. The tapered portion 16b is a portion where the outer diameter gradually decreases toward the speed reduction mechanism case 13 side, that is, toward the lower side. The tapered portion 16b is a lower end portion of the fitting projecting portion 16. That is, the end portion of the fitting projecting portion 16 on the speed reduction mechanism case 13 side is the tapered portion 16b, the outer diameter of which gradually decreases toward the speed reduction mechanism case 13 side.

As illustrated in FIG. 1, the speed reduction mechanism case 13 includes a lid portion 13a, a cylindrical portion 13b, a protruding cylindrical portion 13c, and a second wiring holding portion 15. The lid portion 13a has an annular plate shape with the central axis J as the center. The lid portion 13a covers the lower side of the speed reduction mechanism 30.

The cylindrical portion 13b has a cylindrical shape protruding upward from a radially outer edge portion of the lid portion 13a. The cylindrical portion 13b opens upward. The upper end portion of the cylindrical portion 13b contacts and is fixed to the lower end portion of the case cylindrical portion 12a. The protruding cylindrical portion 13c has a cylindrical shape that protrudes toward both sides in the axial direction from the radially inner edge portion of the lid portion 13a. The protruding cylindrical portion 13c opens on both sides in the axial direction. The upper end portion of the protruding cylindrical portion 13c is positioned lower than the upper end portion of the cylindrical portion 13b.

The bush 54 that has a cylindrical shape that extends in the axial direction Z is disposed inside the protruding cylindrical portion 13c. The bush 54 is fitted in the protruding cylindrical portion 13c and fixed in the protruding cylindrical portion 13c. The bush 54 has a flange portion protruding radially outward at its upper end portion. The flange portion of the bush 54 makes contact with the upper end portion of the protruding cylindrical portion 13c from above. As a result, the bush 54 is prevented from coming out from the inside of the protruding cylindrical portion 13c to the lower side.

The second wiring holding portion 15 protrudes radially outward from the cylindrical portion 13b. In FIG. 1, the second wiring holding portion 15 protrudes toward the negative side in the first direction X from the cylindrical portion 13b. The second wiring holding portion 15 is disposed on the lower side of the first wiring holding portion 14. The second wiring holding portion 15 is, for example, hollow and has a box shape opening upward. The inside of the second wiring holding portion 15 is connected to the inside of the cylindrical portion 13b.

The second wiring holding portion 15 has a bottom wall portion 15a and a side wall portion 15b. The bottom wall portion 15a has a plate shape that extends radially outward from the lid portion 13a. In FIG. 1, the bottom wall portion 15a extends from the lid portion 13a to the negative side in the first direction X. The side wall portion 15b extends upward from the outer edge portion of the bottom wall portion 15a.

The speed reduction mechanism case 13 has the second opening portion 13h. In the present embodiment, the second opening portion 13h is constituted by the upper opening of the cylindrical portion 13b and the upper opening of the second wiring holding portion 15. The fitting projecting portion 16 overlaps with and is fitted in at least a portion of the second opening portion 13h in the axial direction Z. In the present embodiment, the fitting projecting portion 16 is fitted over the entire circumference of the inner peripheral edge portion of the second opening portion 13h.

The motor case 12 and the speed reduction mechanism case 13 are fixed to each other in a state in which the first opening portion 12g and the second opening portion 13h oppose each other in the axial direction Z. The lower end portion of the motor case 12 of the present embodiment includes the lower end portion of the case cylindrical portion 12a and the lower end portion of the first wiring holding portion 14. The upper end portion of the speed reduction mechanism case 13 of the present embodiment includes the upper end portion of the cylindrical portion 13b and the upper end portion of the second wiring holding portion 15. In a state where the motor case 12 and the speed reduction mechanism case 13 are fixed to each other, the inside of the first opening portion 12g and the inside of the second opening portion 13h are connected to each other.

The motor 20 has the motor shaft 21, a rotor 22, and the stator 23. The motor shaft 21 is rotatably supported around the central axis J by the first bearing 51, the second bearing 52, and the third bearing 53. The upper end portion of the motor shaft 21 passes through the bearing holding portion 12e in the axial direction Z and projects above the annular plate portion 12b. Although not illustrated, an eccentric axis portion 21a of the motor shaft 21 supported by the second bearing 52 extends parallel to the central axis J and is centered on an eccentric axis eccentric with respect to the central axis J.

The rotor 22 has a cylindrical rotor core fixed to the outer peripheral surface of the motor shaft 21 and a magnet fixed to the outer peripheral surface of the rotor core. The stator 23 includes an annular stator core that surrounds the radially outer side of the rotor 22 and a plurality of coils that are attached to the stator core. The stator 23 is fixed to the inner peripheral surface of the case cylindrical portion 12a. As a result, the motor 20 is held by the motor case 12.

The control unit 24 includes the control board 70, a second attachment member 73, a second magnet 74, and a second rotation sensor 71. That is, the electric actuator 10 includes the control board 70, the second attachment member 73, the second magnet 74, and the second rotation sensor 71.

The control board 70 has a plate shape extending in a plane perpendicular to the axial direction Z. The control board 70 is housed in the motor case 12. To be more specific, the control board 70 is housed in the control board housing portion 12f and is disposed so as to be separated upward from the annular plate portion 12b. The control board 70 is a board electrically connected to the motor 20. The coil of the stator 23 is electrically connected to the control board 70. The control board 70 controls, for example, the current supplied to the motor 20. That is, for example, an inverter circuit is mounted on the control board 70.

The second attachment member 73 is annular with the central axis J as the center. The inner peripheral surface of the second attachment member 73 is fixed to the outer peripheral surface of the upper end portion of the motor shaft 21. The second attachment member 73 is disposed above the third bearing 53 and the bearing holding portion 12e. The second attachment member 73 is, for example, composed of a nonmagnetic material. Further, the second attachment member 73 may be composed of a magnetic material.

The second magnet 74 has an annular shape with the central axis J as the center. The second magnet 74 is fixed to the upper end surface of the radially outer edge portion of the second attachment member 73. The method of fixing the second magnet 74 to the second attachment member 73 is not particularly limited, and may be, for example, adhesion with an adhesive. The second attachment member 73 and the second magnet 74 rotate together with the motor shaft 21. The second magnet 74 is disposed above the third bearing 53 and the bearing holding portion 12e. The second magnet 74 has north poles and south poles disposed alternately along the circumferential direction. The upper surface of the second magnet 74 is covered with a magnet cover.

The second rotation sensor 71 is a sensor that detects the rotation of the motor 20. The second rotation sensor 71 is attached to the lower surface of the control board 70. The second rotation sensor 71 faces the second magnet 74 and the magnet cover covering the upper surface of the second magnet 74 in the axial direction Z with a gap therebetween. The second rotation sensor 71 detects a magnetic field generated by the second magnet 74. The second rotation sensor 71 is, for example, a Hall element. Although not illustrated, a plurality of, for example, three, second rotation sensors 71 are provided along the circumferential direction. By detecting the change in the magnetic field generated by the second magnet 74 rotating together with the motor shaft 21 using the second rotation sensors 71, the rotation of the motor shaft 21 can be detected.

The connector portion 80 is a portion where connection with electrical wiring outside the case 11 is performed. The connector portion 80 is provided in the motor case 12. The connector portion 80 has the above-described terminal holding portion 12d and the terminal 81. The terminal 81 is embedded and held in the terminal holding portion 12d. One end of the terminal 81 is fixed to the control board 70. The other end of the terminal 81 is exposed on the outside of the case 11 via the inside of the terminal holding portion 12d. The terminal 81 of the present embodiment is, for example, a busbar.

An external power source is connected to the connector portion 80 via electrical wiring (not illustrated). More specifically, an external power supply is attached to the terminal holding portion 12d and electrical wiring of the external power supply is electrically connected to a portion of the terminal 81 that protrudes into the terminal holding portion 12d. As a result, the terminal 81 electrically connects the control board 70 and the electrical wiring to each other. Therefore, in the present embodiment, power is supplied from the external power source to the coil of the stator 23 via the terminal 81 and the control board 70.

The speed reduction mechanism 30 is disposed radially outward of the lower portion of the motor shaft 21. The speed reduction mechanism 30 is housed inside the speed reduction mechanism case 13. The speed reduction mechanism 30 is disposed between the lid portion 13a and the motor 20 in the axial direction Z. The speed reduction mechanism 30 includes an external-tooth gear 31, an internal-tooth gear 33, and an annular portion 43.

The external-tooth gear 31 has a substantially annular plate shape extending in a plane perpendicular to the axial direction Z around the eccentric axis of the eccentric axis portion 21a. A cogwheel portion is provided on the radially outer side surface of the external-tooth gear 31. The external-tooth gear 31 is connected to the motor shaft 21 via the second bearing 52. As a result, the speed reduction mechanism 30 is connected to the motor shaft 21. The external-tooth gear 31 is fitted to the outer rim of the second bearing 52 from the radially outer side. As a result, the second bearing 52 couples the motor shaft 21 and the external-tooth gear 31 so as to be relatively rotatable around the eccentric axis.

The external-tooth gear 31 has a plurality of pins 32. The pins 32 have a cylindrical shape protruding downward. Although not illustrated, the plurality of pins are disposed at regular intervals along the circumferential direction around the eccentric axis serving as the center.

The internal-tooth gear 33 is fixed while surrounding the outside of the external-tooth gear 31 in the radial direction and meshes with the external-tooth gear 31. The internal-tooth gear 33 has a circular ring shape with the central axis J as the center. The radially outer edge portion of the internal-tooth gear 33 is disposed and fixed on a step portion that is recessed radially outward and provided on the inner peripheral surface of the cylindrical portion 13b. As a result, the speed reduction mechanism 30 is held by the speed reduction mechanism case 13. A cogwheel portion is provided on the inner peripheral surface of the internal-tooth gear 33. The cogwheel portion of the internal-tooth gear 33 meshes with the cogwheel portion of the external-tooth gear 31. To be more specific, the cogwheel portion of the internal-tooth gear 33 meshes partially with the cogwheel portion of the external-tooth gear 31.

The annular portion 43 is a portion of the output unit 40. The annular portion 43 is disposed on the lower side of the external-tooth gear 31. The annular portion 43 has an annular plate shape that expands in the radial direction around the central axis J. The annular portion 43 makes contact with the flange portion of the bush 54 from above. The annular portion 43 has a plurality of holes 43a penetrating the annular portion 43 in the axial direction Z. Although not illustrated, the shape as viewed along the axial direction Z of the holes 43a is a circular shape. The inner diameter of the holes 43a is larger than the outer diameter of the pins 32. The plurality of the pins 32 provided in the external-tooth gear 31 are respectively passed through the plurality of the holes 43a. The outer peripheral surface of the pins 32 is inscribed in the inner peripheral surface of the holes 43a. The inner circumferential surface of the holes 43a supports the external-tooth gear 31 so as to enable the external-tooth gear 31 to swing around the central axis J via the pins 32.

The output unit 40 is a portion that outputs the driving force of the electric actuator 10. The output unit 40 has the annular portion 43, a cylindrical portion 42, and an output shaft portion 41. The cylindrical portion 42 has a cylindrical shape extending downward from the inner edge of the annular portion 43. The cylindrical portion 42 has a cylindrical shape that has a bottom portion and opens upward. The cylindrical portion 42 is fitted to the radially inner side of the bush 54. The first bearing 51 is fixed to the inner peripheral surface of the cylindrical portion 42. As a result, the first bearing 51 connects the motor shaft 21 and the output unit 40 so as to be rotatable relative to each other. The lower end portion of the motor shaft 21 is positioned inside the cylindrical portion 42. The lower end surface of the motor shaft 21 faces the upper surface of the bottom portion of the cylindrical portion 42 with a gap therebetween.

The output shaft portion 41 extends in the axial direction Z and is disposed below the motor shaft 21. In the present embodiment, the output shaft portion 41 has a cylindrical shape with the central axis J as the center. The output shaft portion 41 extends downward from the bottom portion of the cylindrical portion 42. The output shaft portion 41 passes through the inside of the protruding cylindrical portion 13c. The lower end portion of the output shaft portion 41 protrudes downward from the protruding cylindrical portion 13c. Another member to which the driving force of the electric actuator 10 is output is attached to the lower end portion of the output shaft portion 41. In the present embodiment, the output unit 40 is a single member.

When the motor shaft 21 is made to rotate around the central axis J, the eccentric axis portion 21a revolves in a circumferential direction around the central axis J as a center. The revolution of the eccentric axis portion 21a is transmitted to the external-tooth gear 31 via the second bearing 52, and the external-tooth gear 31 swings while the internal contact position between the inner peripheral surface of the holes 43a and the outer peripheral surface of the pins 32 changes. As a result, the position where the cogwheel portion of the external-tooth gear 31 and the cogwheel portion of the internal-tooth gear 33 mesh with each other changes in the circumferential direction. Therefore, the rotational force of the motor shaft 21 is transmitted to the internal-tooth gear 33 via the external-tooth gear 31.

Here, in the present embodiment, because the internal-tooth gear 33 is fixed, it does not rotate. Therefore, due to the reaction force of the rotational force transmitted to the internal-tooth gear 33, the external-tooth gear 31 rotates around the eccentric axis. At this time, the rotation direction of the external-tooth gear 31 is opposite to the rotation direction of the motor shaft 21. Rotation of the external-tooth gear 31 around the eccentric axis is transmitted to the annular portion 43 via the holes 43a and the pins 32. As a result, the output unit 40 rotates around the central axis J. In this manner, the rotation of the motor shaft 21 is transmitted to the output unit 40 via the speed reduction mechanism 30.

The rotation of the output unit 40 is decelerated with respect to the rotation of the motor shaft 21 by the speed reduction mechanism 30. Specifically, in the configuration of the speed reduction mechanism 30 of the present embodiment, the reduction ratio R of the rotation of the output unit 40 with respect to the rotation of the motor shaft 21 is represented by R=−(N2−N1)/N2. The minus sign at the head of the expression representing the reduction ratio R indicates that the direction of rotation of the output unit 40 to be decelerated is opposite to the direction in which the motor shaft 21 rotates. N1 is the number of teeth of the external-tooth gear 31 and N2 is the number of teeth of the internal-tooth gear 33. As an example, when the number of teeth N1 of the external-tooth gear 31 is 59 and the number of teeth N2 of the internal-tooth gear 33 is 60, the reduction ratio R is −1/60.

As described above, according to the speed reduction mechanism 30 of the present embodiment, the reduction ratio R of the rotation of the output unit 40 with respect to the rotation of the motor shaft 21 can be made relatively large. Therefore, the rotational torque of the output unit 40 can be made relatively large.

The rotation detection device 60 detects the rotation of the output unit 40. At least a portion of the rotation detection device 60 is disposed at a position overlapping the cylindrical portion 42 in the radial direction. The rotation detection device 60 is housed in the speed reduction mechanism case 13. The rotation detection device 60 has a first magnet 63, a resin portion 61, and a first rotation sensor 62.

The first magnet 63 has a cylindrical shape centered on the central axis J. The first magnet 63 is fixed to the lower surface of the annular portion 43. The first magnet 63 is disposed radially outward of the upper end portion of the protruding cylindrical portion 13c, the cylindrical portion 42 and the bush 54, and surrounds the upper end portion of the protruding cylindrical portion 13c, the cylindrical portion 42 and the bush 54.

The resin portion 61 is disposed so as to straddle the upper surface of the lid portion 13a and the upper surface of the bottom wall portion 15a. The first rotation sensor 62 is embedded in the resin portion 61. The first rotation sensor 62 has sensor terminals 62a. The sensor terminals 62a protrude radially outward from the resin portion 61. Although not illustrated, three sensor terminals 62a are provided, namely, a sensor terminal 62a for signal transmission, a sensor terminal 62a for grounding, and a sensor terminal 62a for power supply.

The first rotation sensor 62 faces the first magnet 63 in the axial direction Z with a gap therebetween. The first rotation sensor 62 detects the magnetic field generated by the first magnet 63. The first rotation sensor 62 is, for example, a Hall element. The rotation detection device 60 can detect the rotation of the output unit 40 by detecting a change in the magnetic field generated by the first magnet 63 rotating together with the output unit 40 by using the first rotation sensor 62. In this way, in the present embodiment, because the electric component is the rotation detection device 60 that detects the rotation of the output unit 40, the detection accuracy of the rotational position of the output unit 40 can be improved.

The first wiring members 91 and the second wiring members 92 are electrically connected to the rotation detection device 60. The first wiring members 91 and the second wiring members 92 of the present embodiment are wiring members that connect the first rotation sensor 62 of the rotation detection device 60 and the control board 70 of the control unit 24 to each other. As illustrated in FIG. 2, in the present embodiment, three first wiring members 91A, 91B, and 91C are provided as the first wiring members 91. In the present embodiment, three second wiring members 92A, 92B, and 92C are provided as the second wiring members 92.

Further, in the following description, the first wiring members 91A, 91B, and 91C are simply referred to as the first wiring members 91 when they are not particularly distinguished and the second wiring members 92A, 92B, and 92C are simply referred to as the second wiring members 92 when they are not particularly distinguished.

The first wiring members 91 have first busbars 91d. The first wiring members 91 of the present embodiment are formed of the first busbars 91d. The first busbars 91d are long and plate-like members. As illustrated in FIG. 1, the first busbars 91d extend from the inside of the second wiring holding portion 15 to the inside of the control board housing portion 12f. A portion of the first busbars 91d is embedded in the fitting projecting portion 16, the first wiring holding portion 14, the case cylindrical portion 12a, and the annular plate portion 12b. As a result, the first wiring members 91 are held by the motor case 12. One-end portions 91e of the first busbars 91d protrude upward from the annular plate portion 12b and are connected to the control board 70. Thus, the first wiring members 91 are electrically connected to the control board 70, and are electrically connected at least indirectly to electrical wiring outside the case 11 via the connector portion 80.

Further, in the present specification, "the first wiring members are electrically connected at least indirectly to electrical wiring outside the case via the connector portion" means that the manner in which the first wiring members are connected is not particularly limited as long as they are electrically connected to electrical wiring connected to the connector portion. In the present embodiment, the first wiring members 91, by being electrically connected to the control board 70 that is electrically connected to the terminal 81 of the connector portion 80, are indirectly electrically connected to electrical wiring via the connector portion 80. Further, the first wiring members 91 may be directly connected to electrical wiring outside the case 11 via the connector portion 80. In this case, the first wiring members 91 are not electrically connected to the control board 70 but are electrically connected to the terminal 81 of the connector portion 80, or a portion of the first wiring members 91 is held by the terminal holding portion 12d serving as a terminal. In the present embodiment, the one-end portions 91e are the upper end portion of the first busbars 91d.

Figure 4:
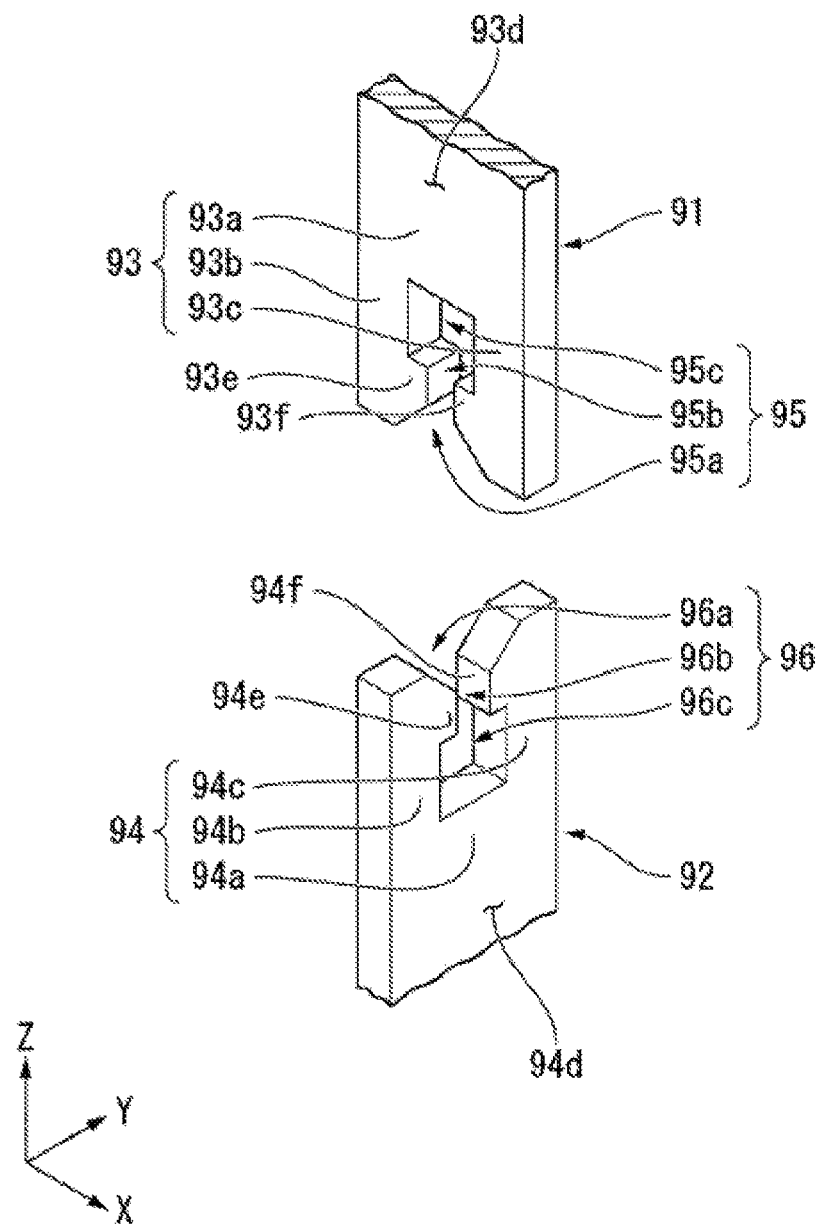
FIG. 4 is a perspective view illustrating a portion of a first wiring member and a portion of a second wiring member according to the present embodiment.

The first busbars 91d have first connection portions 93. That is, the first wiring members 91 have the first connection portions 93. In the present embodiment, the first connection portions 93 are an end portion of the first busbars 91d opposite to the side connected to the control board 70 and are the lower end portion of the first busbars 91d. As illustrated in FIG. 4, the first connection portions 93 have a plate shape having a first plate surface 93d along the first direction X perpendicular to the axial direction Z.

As illustrated in FIG. 3, the first connection portions 93 protrude downward from the fitting projecting portion 16. The first connection portions 93 protrude downward from the case cylindrical portion 12a. The first connection portions 93 are exposed on the lower side of the motor case 12. In the present specification, "the first connection portions are exposed on the lower side of the motor case" means that when the motor case in which the first connection portions are held and which is separated from the speed reduction mechanism case is viewed from below, at least a portion of the first connection portions is visible. By embedding and holding a portion of the first busbars 91d in the motor case 12, the first connection portions 93 are held in the motor case 12.

As illustrated in FIG. 4, the first connection portions 93 each have a first base portion 93a and a pair of first opposing portions 93b and 93c. The pair of first opposing portions 93b and 93c extend downward from the first base portion 93a. That is, the upper end portions of the first opposing portions 93b and 93c are connected to the first base portion 93a. The pair of first opposing portions 93b and 93c oppose each other in the first direction X via a first gap 95. The first opposing portion 93b has a first projecting portion 93e protruding toward the first opposing portion 93c. The lower end portion of the first projecting portion 93e is an inclined portion located on the first opposing portion 93c side, that is, inclined upward toward the positive side in the first direction X. The first opposing portion 93c has a first projecting portion 93f that protrudes toward the first opposing portion 93b. The lower end portion of the first projecting portion 93f is an inclined portion located on the first opposing portion 93b side, that is, inclined upward toward the negative side in the first direction X.

The first gap 95 penetrates the first connection portion 93 in a direction perpendicular to the first plate surface 93d and opens downward. In the present embodiment, the direction perpendicular to the first plate surface 93d is the second direction Y. The first gap 95 includes a first widening portion 95a, a first narrow portion 95b, and a first wide portion 95c. The first widening portion 95a is a portion in which the dimension in the first direction X increases going downward. The first widening portion 95a is the lower end portion of the first gap 95. The first widening portion 95a is a gap portion in the first direction X between the lower end portion of the first projecting portion 93e which is an inclined portion and the lower end portion of the first projecting portion 93f which is an inclined portion. The shape of the first widening portion 95a when viewed along the second direction Y is trapezoidal.

The first narrow portion 95b is connected to the upper side of the first widening portion 95a. The first narrow portion 95b is a gap portion in the first direction X between the first projecting portion 93e and the first projecting portion 93f. The dimension of the first narrow portion 95b in the first direction X is the same as the dimension of the upper end portion of the first widening portion 95a in the first direction X. The dimension of the first narrow portion 95b in the first direction X is smaller than the thickness of second connection portions 94 (to be described later). In the present embodiment, the thickness of the second connection portions 94 is the dimension of the second connection portions 94 in the first direction X. The shape of the first narrow portion 95b when viewed along the second direction Y is rectangular.

The first wide portion 95c is connected to the upper side of the first narrow portion 95b. The dimension of the first wide portion 95c in the first direction X is larger than that of the first narrow portion 95b. The first wide portion 95c is a gap portion in the first direction X between a portion of the first opposing portion 93b above the first projecting portion 93e and a portion of the first opposing portion 93c above the first projecting portion 93f. The shape of the first wide portion 95c when viewed in the second direction Y is a rectangular shape.

As illustrated in FIG. 2, the second wiring members 92 have second busbars 92d. The second wiring members 92 of the present embodiment are formed of the second busbars 92d. The second busbars 92d are long and plate-like members. A portion of the second busbars 92d is embedded in the bottom wall portion 15a. As a result, the second wiring members 92 are held by the speed reduction mechanism case 13. One-end portions 92e of the second busbars 92d protrude upward from the bottom wall portion 15a. As illustrated in FIG. 3, the one-end portions 91e are connected to the sensor terminals 62a of the first rotation sensor 62. As a result, the second wiring members 92 are electrically connected to the rotation detection device 60.

The second busbars 92d have the second connection portions 94. That is, the second wiring members 92 have the second connection portions 94. The second connection portions 94 of the present embodiment are an end portion of the second busbars 92d on the opposite side to the side connected to the first rotation sensor 62. As illustrated in FIG. 2, each of the second connection portions 94 has a plate shape having a second plate surface 94d that is perpendicular to the axial direction Z and that extends in a second direction Y crossing the first direction X.

The second connection portions 94 protrude upward from the bottom wall portion 15a radially outward from the one-end portion 92e. The upper end portion of the second connection portions 94 is located above the upper end portion of the one-end portions 92e. The second connection portions 94 are exposed on the upper side of the speed reduction mechanism case 13. In the present specification, "the second connection portions are exposed on the upper side of the speed reduction mechanism case" means that, when the speed reduction mechanism case in which the second connection portions are held and which is separated from the motor case is viewed from the upper side, at least a portion of the second connection portions is visible. By embedding and holding a portion of the second busbars 92d in the speed reduction mechanism case 13, the second connection portion 94 is held by the speed reduction mechanism case 13.

As illustrated in FIG. 4, each of the second connection portions 94 includes a second base portion 94a and a pair of second opposing portions 94b and 94c. The pair of second opposing portions 94b and 94c extend upward from the second base portion 94a. That is, the lower end portions of the second opposing portions 94b and 94c are connected to the second base portion 94a. The pair of second opposing portions 94b and 94c oppose each other in the second direction Y with a second gap 96 therebetween. The second opposing portion 94b has a second projecting portion 94e that protrudes toward the second opposing portion 94c. The upper end portion of the second projecting portion 94e is an inclined portion located on the second opposing portion 94c side, that is, inclined downward toward the positive side in the second direction Y. The second opposing portion 94c has a second projecting portion 94f that protrudes toward the second opposing portion 94b. The upper end portion of the second projecting portion 94f is an inclined portion located on the second opposing portion 94b side, that is, inclined downward toward the negative side in the second direction Y.

The second gap 96 penetrates the second connection portion 94 in a direction perpendicular to the second plate surface 94d and opens upward. The direction perpendicular to the second plate surface 94d of the present embodiment is the first direction X. The second gap 96 has a second widening portion 96a, a second narrow portion 96b, and a second wide portion 96c. The second widening portion 96a is a portion in which the dimension in the second direction Y increases going upward. The second widening portion 96a is an upper end portion of the second gap 96. The second widening portion 96a is a gap portion in the second direction Y between the upper end portion of the second projecting portion 94e, which is an inclined portion, and the upper end portion of the second projecting portion 94f, which is an inclined portion. The shape of the second widening portion 96a when viewed along the first direction X is trapezoidal.

The second narrow portion 96b is connected to the lower side of the second widening portion 96a. The second narrow portion 96b is a gap portion in the second direction Y between the second projecting portion 94e and the second projecting portion 94f. The dimension of the second narrow portion 96b in the second direction Y is the same as the dimension of the lower end portion of the second widening portion 96a in the second direction Y. The dimension of the second narrow portion 96b in the second direction Y is smaller than the thickness of the first connection portion 93. In the present embodiment, the thickness of the first connection portion 93 is the dimension of the first connection portion 93 in the second direction Y. The thickness of the first connection portion 93 and the thickness of the second connection portion 94 are, for example, the same. The shape of the second narrow portion 96b when viewed along the first direction X is rectangular.

The second wide portion 96c is connected to the lower side of the second narrow portion 96b. The dimension of the second wide portion 96c in the second direction Y is larger than that of the second narrow portion 96b. The second wide portion 96c is a gap portion in a second direction Y between a portion of the second opposing portion 94b below the second projecting portion 94e and a portion of the second opposing portion 94c below the second projecting portion 94f. The shape of the second wide portion 96c when viewed along the first direction X is rectangular.

The first connection portion 93 and the second connection portion 94 of the present embodiment have different attitudes and orientations, however, for example, the shapes are the same as each other. As illustrated in FIG. 2 and FIG. 3, in a state where the motor case 12 and the speed reduction mechanism case 13 are fixed to each other, the first connection portions 93 and the second connection portions 94 are disposed at positions where the first gap 95 and the second gap 96 overlap at least partially and are electrically connected to each other. As a result, the second busbars 92d are electrically connected to the first busbars 91d, and the first wiring members 91 and the second wiring members 92 are electrically connected to each other.

Further, in the present specification, "the first gap and the second gap overlap at least partially" means that at least a portion of the second gap is located between the pair of the first opposing portions in the first direction X and at least a portion of the first gap is located between the pair of the second opposing portions in the second direction Y. In addition, "the first gap and the second gap overlap at least partially" means that the lower end surface of the first base portion, that is, the upper surface constituting the first wide portion, and the upper end surface of the second base portion, that is, the lower surface constituting the second wide portion, are in contact with each other.

Figure 5:
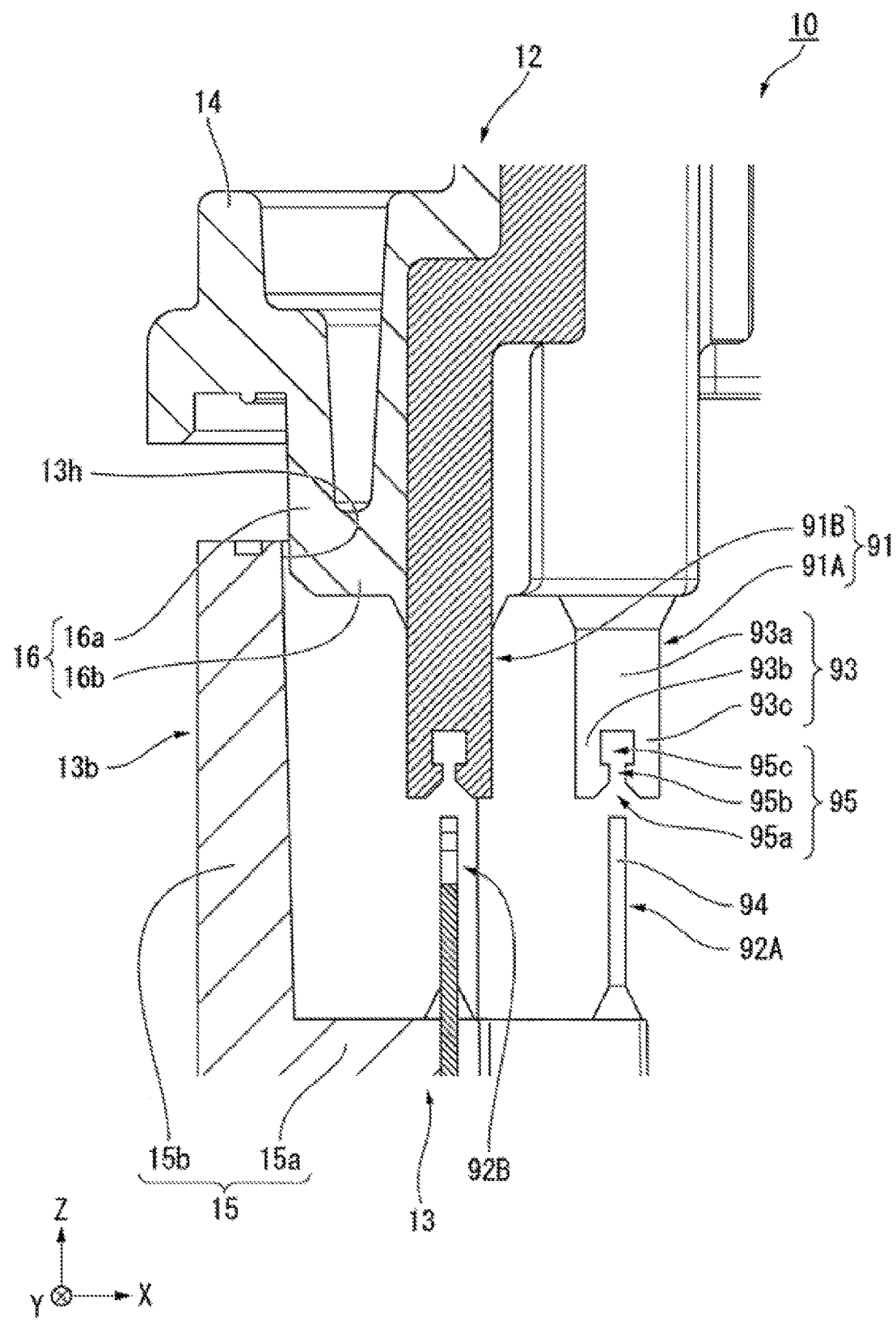
FIG. 5 is a sectional view illustrating a step of a procedure of assembling the electric actuator of the present embodiment.

When connecting the first wiring members 91 and the second wiring members 92, as illustrated in FIG. 5, the motor case 12 and the speed reduction mechanism case 13 are brought close to each other in the axial direction Z. As a result, the first connection portions 93 are inserted into the second wiring holding portion 15 and the first connection portions 93 and the second connection portions 94 are brought close to each other in the axial direction Z. As each of the first connection portions 93 and corresponding ones of the second connection portions 94 are brought closer to each other in the axial direction Z, the first widening portion 95a and the second widening portion 96a first overlap each other, then the first narrow portion 95b and the second narrow portion 96b overlap each other, and then the first wide portion 95c and the second wide portion 96c overlap each other.

Then, as illustrated in FIG. 2, the second base portion 94a is inserted into the first narrow portion 95b, and the first base portion 93a is inserted into the second narrow portion 96b. As a result, the first connection portions 93 and the second connection portions 94 whose front ends are bifurcated are engaged with each other. The pair of first opposing portions 93b and 93c sandwich the second base portion 94a in the first direction X and contact the second base portion 94a. To be more specific, the first projecting portion 93e comes into contact with one second plate surface 94d of the second connection portions 94. The first projecting portion 93f comes into contact with the other second plate surface 94d of the second connection portions 94.

The pair of second opposing portions 94b and 94c sandwich the first base portion 93a in the second direction Y and contact the first base portion 93a. To be more specific, the second projecting portion 94e comes into contact with one first plate surface 93d of the first connection portions 93. The second projecting portion 94f comes into contact with the other first plate surface 93d of the first connection portions 93. As a result, the first connection portions 93 and the second connection portions 94 are electrically connected to each other, and the first wiring members 91 and the second wiring members 92 are connected to each other. The lower end surface of the first base portion 93a and the upper end surface of the second base portion 94a may or may not be in contact with each other.

According to the present embodiment, as described above, by fixing the motor case 12 and the speed reduction mechanism case 13 close to each other in the axial direction Z, the first connection portions 93 exposed on the lower side of the motor case 12 and the second connection portions 94 exposed on the upper side of the speed reduction mechanism case 13 can be connected to each other. As a result, because it is possible to electrically connect the first wiring members 91 to the second wiring members 92, it is not necessary to separately perform the work of connecting the wiring members to each other, and it is possible to easily electrically connect the first wiring members 91 held by the motor case 12 to the rotation detection device 60. In addition, it is not necessary to provide the case 11 with an opening portion for connecting the wiring members to each other.

Therefore, for example, in the case where the first wiring members 91 are electrically connected to the control board 70 as in the present embodiment, by merely fixing the motor case 12 and the speed reduction mechanism case 13 to each other, the rotation detection device 60 can be electrically connected to the control board 70 via the first wiring members 91 and the second wiring members 92. As described above, according to the present embodiment, it is possible to reduce the labor and manufacturing cost of assembling the electric actuator 10.

In addition, the first connection portions 93 and the second connection portions 94 that have plate surfaces along directions intersecting each other can be prevented from being disconnected from each other by engaging the first gap 95 and the second gap 96 in a state of overlapping at least partially. As a result, it is possible to easily and stably connect the first connection portions 93 and the second connection portions 94.

In addition, according to the present embodiment, the lower end of the first gap 95 is the first widening portion 95a, and the upper end of the second gap 96 is the second widening portion 96a. Therefore, even in the case where the position of the first connection portions 93 and the position of the second connection portions 94 are deviated, the positions of the respective connection portions can be mutually guided by the widening portions, and the first connection portions 93 and the second connection portions 94 can be easily connected to each other.

In the present embodiment, the pair of the first opposing portions 93b and 93c sandwich the second base portion 94a in the first direction X, and the pair of the second opposing portions 94b and 94c sandwich the first base portion 93a in the second direction Y. Therefore, it is possible to more stably connect the first connection portions 93 and the second connection portions 94 to each other. In addition, the pair of the first opposing portions 93b and 93c are in contact with the second base portion 94a and the pair of the second opposing portions 94b and 94c are in contact with the first base portion 93a, respectively. As a result, each of the first connection portions 93 and corresponding ones of the second connection portions 94 are in contact with each other at four points. Therefore, it is possible to more reliably electrically connect the first connection portions 93 and the second connection portions 94 to each other.

In addition, in the present embodiment, the dimension of the first narrow portion 95b in the first direction X is smaller than the thickness of the second connection portion 94, and the dimension of the second narrow portion 96b in the second direction Y is smaller than the thickness of the first connection portion 93. Therefore, by sandwiching the second base portion 94a between the pair of the first opposing portions 93b and 93c, the first projecting portions 93e and 93f of the first opposing portions 93b and 93c can be more reliably brought into contact with the second base portion 94a. In addition, by sandwiching the first base portion 93a between the pair of the second opposing portions 94b and 94c, the second projecting portions 94e and 94f of the second opposing portions 94b and 94c can be more reliably brought into contact with the first base portion 93a. Therefore, the first wiring members 91 and the second wiring members 92 can be more reliably electrically connected to each other.

In addition, when the first narrow portion 95b and the second narrow portion 96b overlap each other, each narrow portion is pushed out by inserting a portion of either of the connection portions. As a result, a load is applied to the first connection portion 93 and the second connection portion 94 in the axial direction Z. On the other hand, when the first connection portion 93 and the second connection portion 94 further approach each other in the axial direction Z, the entirety of the first narrow portion 95b overlaps with the second wide portion 96c, and the entirety of the second narrow portion 96b overlaps with the first wide portion 95c. In this case, because either connection portion is not inserted into a corresponding narrow portion, each narrow portion cannot be widened. Therefore, the above-described load in the axial direction Z disappears or decreases.

As described above, according to the present embodiment, because each of the connection portions has a narrow portion and a wide portion, respectively, the load generated in the course of connecting the first connection portions 93 and the second connection portions 94 becomes rapidly smaller. Therefore, an operator assembling the electric actuator 10 can judge whether or not the first connection portions 93 and the second connection portions 94 are connected in the case 11 by detecting such a change in the load. As a result, whether or not the first wiring members 91 and the second wiring members 92 are electrically connected can be easily judged at the time of assembly, and the production efficiency of the electric actuator 10 can be improved.

In addition, according to the present embodiment, because the fitting projecting portion 16 is provided, by fitting the fitting projecting portion 16 into the second opening portion 13h, the motor case 12 can be moved radially relative to the speed reduction mechanism case 13. As a result, it is possible to accurately align the positions of the first connection portions 93 and the second connection portions 94 and to easily connect the first connection portions 93 and the second connection portions 94 to each other. In addition, the end portion of the fitting projecting portion 16 on the speed reduction mechanism case 13 side is the tapered portion 16b. Therefore, in the case where the motor case 12 is brought close to the speed reduction mechanism case 13 in a state where the position thereof is deviated, the tapered portion 16b can guide the fitting projecting portion 16 to the second opening portion 13h and the position of the motor case 12 can be aligned with the position of the speed reduction mechanism case 13. Therefore, it is easy to align the motor case 12 and the speed reduction mechanism case 13.

As illustrated in FIG. 3, in the present embodiment, the dimension H1 of the fitting projecting portion 16 in the axial direction Z is greater than the distance L between the lower end portion of the first connection portions 93 and the upper end portion of the second connection portions 94 in the axial direction Z in a state where the motor case 12 and the speed reduction mechanism case 13 are fixed. As a result, as illustrated in FIG. 5, the first connection portions 93 and the second connection portions 94 can be apart from each other in the axial direction Z when the fitting projecting portion 16 starts to be fitted into the second opening portion 13h. Therefore, before the first connection portions 93 and the second connection portions 94 come into contact with each other, the motor case 12 and the speed reduction mechanism case 13 can be positioned by the fitting projecting portion 16. As a result, it is possible to connect the first connection portions 93 and the second connection portions 94 in a state where they are positioned, and the first connection portions 93 and the second connection portions 94 can be easily connected.

As illustrated in FIG. 3, in the present embodiment, the dimension H2 in the axial direction Z of the fitting projecting portion main body 16a is larger than the distance L. Therefore, even when the fitting projecting portion main body 16a starts to be fitted into the second opening portion 13h, the first connection portions 93 and the second connection portions 94 can be apart from each other in the axial direction Z. Therefore, the first connection portion 93 and the second connection portion 94 can be more easily connected.

As described above, in the present embodiment, the first wiring members 91 and the second wiring members 92 are provided in a plurality. As illustrated in FIG. 2, three first connection portions 93 of the first wiring member 91 are disposed side by side in the second direction Y when viewed in the first direction X. The first connection portion 93 at the center of the three first connection portions 93 in the second direction Y is disposed radially outward of the other two first connection portions 93. In FIG. 2, the first connection portion 93 of the first wiring member 91B is disposed radially outward of the first connection portion 93 of the first wiring member 91A and the first connection portion 93 of the first wiring member 91C. The first connection portion 93 of the first wiring member 91A and the first connection portion 93 of the first wiring member 91C are disposed so as to oppose each other with a gap therebetween in the second direction Y.

Three second connection portions 94 of the second wiring member 92 are disposed side by side in the second direction Y when viewed in the first direction X. The second connection portion 94 at the center of the three second connection portions 94 in the second direction Y is disposed radially outward of the other two second connection portions 94. In FIG. 2, the second connection portion 94 of the second wiring member 92B is disposed radially outward of the second connection portion 94 of the second wiring member 92A and the second connection portion 94 of the second wiring member 92C. The second connection portion 94 of the second wiring member 92A and the second connection portion 94 of the second wiring member 92C are disposed so as to oppose each other with a gap therebetween in the second direction Y.

The first connection portion 93 of the first wiring member 91A is connected to the second connection portion 94 of the second wiring member 92A. The first connection portion 93 of the first wiring member 91B is connected to the second connection portion 94 of the second wiring member 92B. The first connection portion 93 of the first wiring member 91C is connected to the second connection portion 94 of the second wiring member 92C. As a result, connection wiring portions 97 each including the first connection portion 93 and the second connection portion 94 connected to each other are provided in a plurality.

The distances from the motor shaft 21 to at least two connection wiring portions 97 are different from each other. Therefore, it is easy to secure the distance between the connection wiring portions 97 formed by connecting the first connection portions 93 and the second connection portions 94 having plate surfaces intersecting with each other, and is easy to reduce the arrangement space of the plurality of connection wiring portions 97.

Because the first connection portions 93 and the second connection portions 94 are disposed as described above, three of the connection wiring portions 97, when viewed along the radial direction of the motor shaft 21, are provided side by side in the second direction Y perpendicular to the axial direction Z. The central connection wiring portion 97 in the second direction Y among the three connection wiring portions 97 is disposed further away from the motor shaft 21 than the other two connection wiring portions 97. Further, in the present embodiment, the second direction Y corresponds to the third direction.

Because the connection wiring portions 97 are disposed as described above, the distance between the three connection wiring portions 97 is sufficiently large as compared with the case where the three connection wiring portions 97 are aligned in the first direction X or the second direction Y, and it is possible to dispose the three connection wiring portions 97 collectively in a comparatively small space. As a result, it is possible to further suppress an increase in the size of the electric actuator 10.

According to the present embodiment, the power of the rotation detection device 60 can be obtained from the power supply of the motor 20 connected to the control board 70, and a single external power source can be connected to the electric actuator 10. Therefore, the configuration of the electric actuator 10 can be simplified. Specifically, in the case of the present embodiment, by obtaining the power supply of the rotation detection device 60 from the external power source connected to the control board 70 via the connector portion 80, a single external power source can be connected to the electric actuator 10.

In addition, according to the present embodiment, because each wiring member has a busbar, it is easy to make the rigidity of each wiring member relatively large. As a result, each wiring member can be stably held for each case. In addition, by using a portion of each of the busbars as a connection portion, the positions of the respective connection portions are easily stabilized when fixing respective cases, and it is easy to connect respective connection portions with each other. In addition, for example, each wiring member can be inserted into a metal mold and each case can be manufactured by insert molding, making it easy to manufacture each case.

The present disclosure is not limited to the above-described embodiment and other configurations may be adopted. It is only necessary for one of the motor case and the speed reduction mechanism case to have the fitting projecting portion. That is, the fitting projecting portion may be included in the speed reduction mechanism case. That is, one case may be the speed reduction mechanism case and the other case may be the motor case. In this case, the fitting projecting portion is overlapped with and fitted in at least a portion of the first opening portion of the motor case in the axial direction Z.

The first gap need not have the first widening portion. The second gap need not have the second widening portion. In addition, the first connection portion and the second connection portion may be electrically connected to each other and may be connected at less than four points. For example, only one of the pair of first opposing portions and the pair of second opposing portions need be in contact with the base portion of the other connection portion at two points. The shape of the first connection portion and the shape of the second connection portion may be different from each other. The first plate surface of the first connection portion and the second plate surface of the second connection portion need not be perpendicular as long as they are not parallel to each other. That is, the first direction and the second direction do not have to be perpendicular as long as they cross each other.

The first wiring members need not be connected to the control board. In this case, for example, the end portions of the first wiring members, which are on the opposite side to the connection portions, may be exposed on the outside of the case via the terminal holding portion. As a result, it is possible to directly connect the electrical wiring of the external power source connected to the connector portion to the first wiring members.

In addition, either one of the first wiring members and the second wiring members need not be embedded in the case or both of the first wiring members and the second wiring members need not be embedded in the case. In addition, in the above embodiment, each wiring member is constituted only by a respective busbar, but it is not limited thereto. Each wiring member is not particularly limited as long as it has a plate-like connection portion. For example, the wiring member may have a plate-like connection portion and a lead wire electrically connected to the connection portion. In addition, there is no particular limitation as long as the number of the first wiring members and the number of the second wiring members are each one or more.

In addition, the control board need not be provided. In this case, the terminal held by the terminal holding portion is directly connected to the coil of the stator. In addition, the board housed in the motor case need not be the control board. In this case, an inverter circuit and the like are provided outside the electric actuator.

In addition, the configuration of the rotation detection device is not particularly limited as long as it can detect the rotation of the output unit and is housed in the speed reduction mechanism case. The first rotation sensor is not particularly limited as long as the rotation of the output unit can be detected, and may be a magnetoresistive device. In addition, similarly, the second rotation sensor may be a magnetoresistive element.

The electric component is not particularly limited as long as it is a component electrically connected to the electrical wiring outside the case by the first wiring member and the second wiring member, and it is not limited to the rotation detection device. In addition, the configuration of the speed reduction mechanism is not particularly limited as long as it can slow the rotation of the motor shaft. In addition, the first bearing, the second bearing, and the third bearing are not particularly limited as long as they can support the motor shaft, and may be, for example, sliding bearings or the like.

In addition, the application of the electric actuator of the present disclosure is not limited, and the electric actuator of the present disclosure may be mounted on any equipment. In addition, the above-described configurations can be appropriately combined to the extent they are not inconsistent with each other.

Features of the above-described embodiments and the modifications thereof may be combined appropriately as long as no conflict arises.

While embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric actuator comprising:
   a motor having a motor shaft that extends in an axial direction;
   a first case that houses the motor and that has a first opening portion that opens to one side in the axial direction;
   a connector portion provided in the first case and to be connected to electrical wiring outside the first case;
   at least one first wiring member, at least indirectly, electrically connected to the electrical wiring via the connector portion and held by the first case;
   a second case having a second opening portion that opens to the other side in the axial direction;
   an electric component housed in the second case; and
   at least one second wiring member electrically connected to the electric component and held by the second case,
   wherein the first case and the second case are fixed to each other in a state in which the first opening portion and the second opening portion oppose each other in the axial direction,
   wherein the at least one first wiring member has a first connection portion exposed to the one side in the axial direction of the first case,
   wherein the at least one second wiring member has a second connection portion exposed to the other side in the axial direction of the second case,
   wherein the first connection portion has a plate shape having a first plate surface along a first direction perpendicular to the axial direction and has a pair of first opposing portions that oppose each other in the first direction with a first gap between the pair of first opposing portions, the first gap penetrating the first connection portion in a direction perpendicular to the first plate surface and opening to the one side in the axial direction,
   wherein the second connection portion has a plate shape having a second plate surface that is perpendicular to the axial direction and that extends in a second direction crossing the first direction and has a pair of second opposing portions that oppose each other in the second direction with a second gap between the pair of second opposing portions, the second gap penetrating the second connection portion in a direction perpendicular to the second plate surface and opening to the other side in the axial direction,
   wherein the first gap includes a first narrow portion and a first wide portion connected to the first narrow portion on the other side in the axial direction and having a dimension in the first direction larger than a dimension of the first narrow portion,
   wherein the second gap has a second narrow portion and a second wide portion connected to the second narrow portion on the one side in the axial direction and having a dimension in the second direction larger than a dimension of the second narrow portion, and
   wherein the first connection portion and the second connection portion are disposed at positions where the first gap and the second gap overlap at least partially in a state in which the first case and the second case are fixed, and the first connection portion and the second connection portion are electrically connected to each other.

2. The electric actuator according to claim 1,
   wherein an end portion of the first gap on the one side in the axial direction is a first widening portion in which the dimension in the first direction increases toward the one side in the axial direction, and
   wherein an end portion of the second gap on the other side in the axial direction is a second widening portion in which the dimension in the second direction increases toward the other side in the axial direction.

3. The electric actuator according to claim 1,
   wherein the first connection portion has a first base portion to which end portions of the pair of first opposing portions on the other side in the axial direction are connected,
   wherein the second connection portion has a second base portion to which end portions of the pair of second opposing portions on the one side in the axial direction are connected,
   wherein the pair of first opposing portions sandwich the second base portion in the first direction and are in contact with the second base portion, and
   wherein the pair of second opposing portions sandwich the first base portion in the second direction and are in contact with the first base portion.

4. The electric actuator according to claim 2,
   wherein the first connection portion has a first base portion to which end portions of the first opposing portions on the other side in the axial direction are connected, wherein the second connection portion has a second base portion to which end portions of the second opposing portions on the one side in the axial direction are connected, wherein the pair of first opposing portions sandwich the second base portion in the first direction and are in contact with the second base portion, and wherein the pair of second opposing portions sandwich the first base portion in the second direction and are in contact with the first base portion.

5. The electric actuator according to claim 1, wherein one of the first case and the second case includes a fitting projecting portion that overlaps with at least a portion of the first opening portion or the second opening portion of the other of the first case and the second case in the axial direction, and wherein an end portion of the fitting projecting portion toward the other case is a tapered portion, the outer diameter of which gradually decreases toward the other case.

6. The electric actuator according to claim 5, wherein a dimension of the fitting projecting portion in the axial direction is larger than a distance, in the axial direction, between an end portion of the first connection portion on the one side in the axial direction and an end portion of the second connection portion on the other side in the axial direction in a state where the first case and the second case are fixed.

7. The electric actuator according to claim 2, wherein one of the first case and the second case includes a fitting projecting portion that overlaps with at least a portion of the first opening portion or the second opening portion of the other of the first case and the second case in the axial direction, and wherein an end portion of the fitting projecting portion toward the other case is a tapered portion, the outer diameter of which gradually decreases toward the other case.

8. The electric actuator according to claim 7, wherein a dimension of the fitting projecting portion in the axial direction is larger than a distance, in the axial direction, between an end portion of the first connection portion on the one side in the axial direction and an end portion of the second connection portion on the other side in the axial direction in a state where the first case and the second case are fixed.

9. The electric actuator according to claim 3, wherein one of the first case and the second case includes a fitting projecting portion that overlaps with at least a portion of the first opening portion or the second opening portion of the other of the first case and the second case in the axial direction, and wherein an end portion of the fitting projecting portion toward the other case is a tapered portion, the outer diameter of which gradually decreases toward the other case.

10. The electric actuator according to claim 9, wherein a dimension of the fitting projecting portion in the axial direction is larger than a distance, in the axial direction, between an end portion of the first connection portion on the one side in the axial direction and an end portion of the second connection portion on the other side in the axial direction in a state where the first case and the second case are fixed.

11. The electric actuator according to claim 4, wherein one of the first case and the second case includes a fitting projecting portion that overlaps with at least a portion of the first opening portion or the second opening portion of the other of the first case and the second case in the axial direction, and wherein an end portion of the fitting projecting portion toward the other case is a tapered portion, the outer diameter of which gradually decreases toward the other case.

12. The electric actuator according to claim 11, wherein a dimension of the fitting projecting portion in the axial direction is larger than a distance, in the axial direction, between an end portion of the first connection portion on the one side in the axial direction and an end portion of the second connection portion on the other side in the axial direction in a state where the first case and the second case are fixed.

13. The electric actuator according to claim 1, wherein, the dimension of the first narrow portion in the first direction is smaller than a thickness of the second connection portion, and wherein the dimension of the second narrow portion in the second direction is smaller than a thickness of the first connection portion.

14. The electric actuator according to claim 1, wherein the at least one first wiring member includes a plurality of first wiring members and the at least one second wiring member includes a plurality of second wiring members, wherein a plurality of connection wiring portions is provided, each of which includes one of the first connection portions and one of the second connection portions connected to each other, wherein at least two of the connection wiring portions have distances, from the motor shaft, different from each other.

15. The electric actuator according to claim 14, wherein the plurality of connection wiring portions includes three connection wiring portions provided side by side in a third direction perpendicular to the axial direction when viewed along a radial direction of the motor shaft, and wherein the connection wiring portion at a center of the three connection wiring portions in the third direction is disposed to be separated from the motor shaft more than the other two connection wiring portions are separated.

16. The electric actuator according to claim 1, further comprising:

a speed reduction mechanism disposed on a radially outer side of a portion of the motor shaft on the one side in the axial direction and connected to the motor shaft;

an output unit to which rotation of the motor shaft is transmitted via the speed reduction mechanism; and a board which is electrically connected to the motor and is housed in the first case, wherein the electric component is a rotation detection device that detects rotation of the output unit.

* * * * *